US011420620B1

(12) United States Patent
Krekel et al.

(10) Patent No.: US 11,420,620 B1
(45) Date of Patent: Aug. 23, 2022

(54) VEHICLE PARKING ASSISTANCE SYSTEMS AND METHODS

(71) Applicant: Ford Global Technologies, LLC, Dearborn, MI (US)

(72) Inventors: Markus Krekel, Nordrhein-Westfalen (DE); Karolina Skiba, Canton, MI (US); Eric Reed, Livonia, MI (US); Sneha Bagga, Pleasanton, CA (US); Adithya Ramachandran, Farmington Hills, MI (US); Ghassan El-hosseiny, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 17/206,328

(22) Filed: Mar. 19, 2021

(51) Int. Cl.
| | |
|---|---|
| *H04N 5/44* | (2011.01) |
| *B60W 30/06* | (2006.01) |
| *B60Q 1/46* | (2006.01) |
| *B60Q 5/00* | (2006.01) |
| *G06V 20/58* | (2022.01) |

(52) U.S. Cl.
CPC .............. *B60W 30/06* (2013.01); *B60Q 1/46* (2013.01); *B60Q 5/00* (2013.01); *G06V 20/586* (2022.01)

(58) Field of Classification Search
CPC .......... B60W 30/06; B60Q 1/46; B60Q 5/00; G06V 20/586
See application file for complete search history.

(56) References Cited

U.S. PATENT DOCUMENTS

| | | | | |
|---|---|---|---|---|
| 3,723,968 | A * | 3/1973 | Kelly | B60T 17/22 340/384.1 |
| 8,044,788 | B2 * | 10/2011 | Lundgren | A61P 35/00 340/459 |
| 9,994,175 | B2 * | 6/2018 | Maeshiro | B60Q 1/1407 |
| 2008/0224841 | A1 * | 9/2008 | Lundgren | A61P 35/00 340/453 |
| 2014/0310594 | A1 | 10/2014 | Ricci et al. | |
| 2015/0175008 | A1 * | 6/2015 | Honda | B60W 20/00 180/65.265 |
| 2015/0177362 | A1 | 6/2015 | Gutierrez et al. | |
| 2016/0063863 | A1 | 3/2016 | Stefik et al. | |
| 2017/0147887 | A1 | 5/2017 | Be et al. | |

(Continued)

FOREIGN PATENT DOCUMENTS

| | | |
|---|---|---|
| DE | 102015209976 A | 12/2016 |
| DE | 102020105862 A | 9/2020 |

OTHER PUBLICATIONS

Andrea Morrow, "Keyless Ignition—Voyomotive Introduces New Warning Feature to Prevent Drivers from Leaving Cars With Engine Running", Online Visibility from Vocus, Aug. 9, 2018, 2 pages.

*Primary Examiner* — Munear T Akki
(74) *Attorney, Agent, or Firm* — Markus Markowitz; Eversheds Sutherland (US) LLP

(57) ABSTRACT

Systems and methods for driver presence and position detection are disclosed herein. A method can include determining whether a vehicle is in an open area or an enclosed area, determining that a key of the vehicle is no longer present inside the vehicle and an ignition of the vehicle is on, suppressing or delaying a warning message that indicates that the key of the vehicle is no longer present inside the vehicle and the vehicle is in the open area, and providing the warning message when the vehicle is in the enclosed area.

20 Claims, 3 Drawing Sheets

(56) References Cited

U.S. PATENT DOCUMENTS

2017/0297577 A1* 10/2017 Tsuji ................ F16H 61/16
2019/0143944 A1* 5/2019 Park ................ B60R 25/1001
　　　　　　　　　　　　　　　　　　　　340/426.24
2021/0276484 A1* 9/2021 Kim ................ B60W 50/14

* cited by examiner

VEHICLE PARKING ASSISTANCE SYSTEMS AND METHODS

BACKGROUND

Some vehicles are permitted to operate in a keyless manner, where the engine remains running when a key is removed from the vehicle. One example feature includes remote park or maneuver assistance where the vehicle may guide itself, e.g., into a parking space, while the driver and key (such as a keyfob or other similar driver authentication device(s) such as a smartphone enabled with an application or phone-as-a-key "PaaK", near-field communications "NFC" card, radio-frequency "RF" identification card, and the like) are outside the vehicle. These situations may create an issue when a user forgets to switch off the ignition/engine when leaving the vehicle in an enclosed or partially enclosed location. One countermeasure implemented to prevent users from inadvertently leaving their vehicle running in an enclosed space is to provide a warning message. For example, a horn chirp or other vehicle response can be used to remind the user. However, user dissatisfaction may occur when vehicle features require the user to exit the vehicle with the key and leave the engine running, but a warning is provided to the user anyway.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
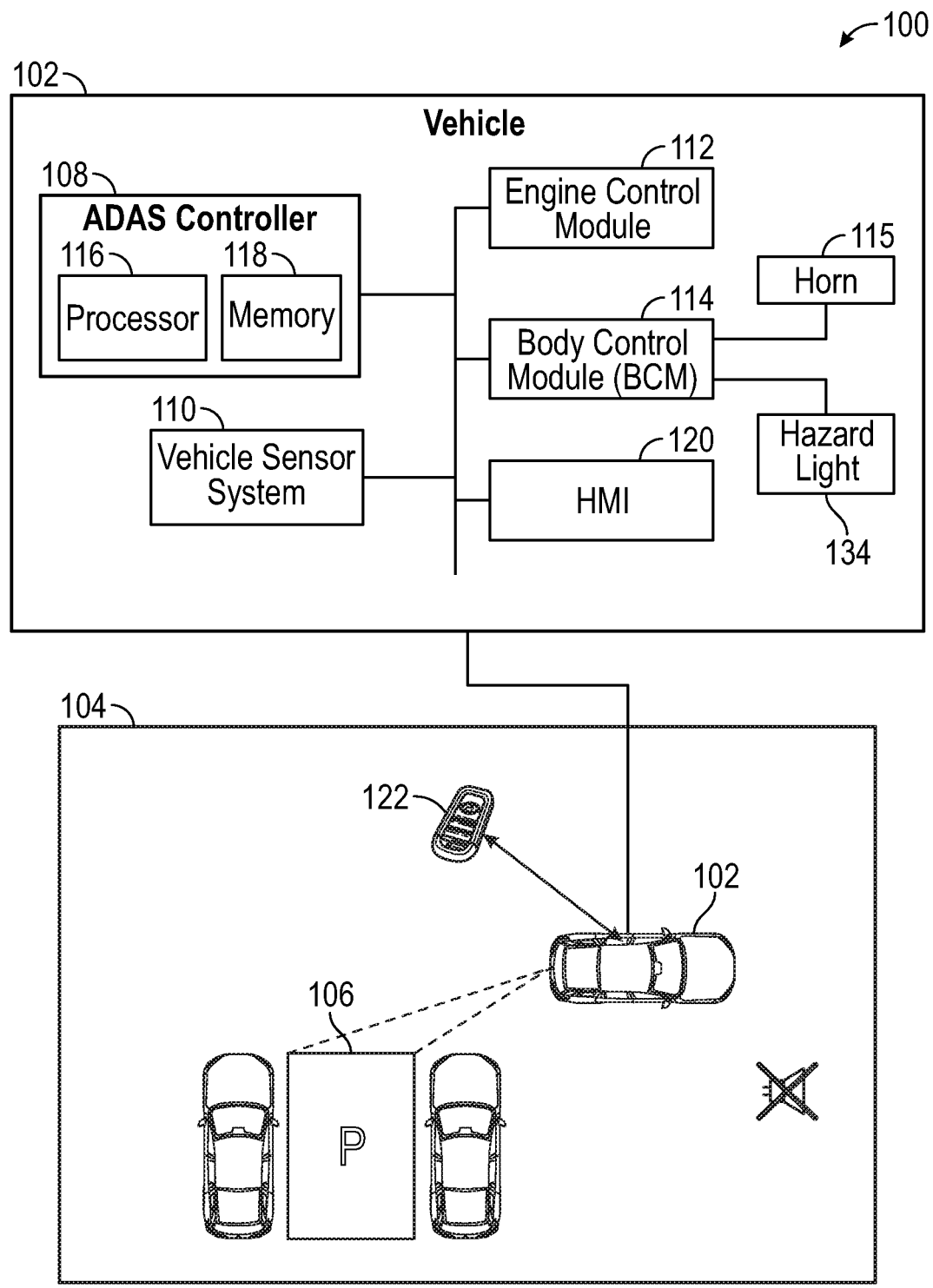
FIG. 1 illustrates an example architecture where the systems and methods of the present disclosure may be practiced.

The present disclosure generally pertains to systems and methods that can suppress or delay warning messages to a user in instances where a vehicle ignition remains on while the user and a key of the vehicle are not inside the vehicle, as well as the vehicle being in an enclosed area. As noted above, these situations may be encountered when a user is utilizing an automatic parking feature of the vehicle, such as Remote Park Assist (RePA). While some examples reference RePA, the present disclosure can be applied to the use of other parking or self-driving features as well. More so, the vehicle may be an internal combustion engine, electric, or hybrid vehicle.

The RePA feature allows the user to park their vehicle in tight spots while controlling the maneuver from the outside. As the vehicle is driven at low speeds, the RePA feature can identify an available parking spot. When the available parking spot is identified, the user may be prompted to exit the vehicle and continue the remote parking procedure from outside the vehicle. In these instances, the ignition and/or engine may remain running/on to prevent a loss of data that could occur upon an ignition cycle. The key may also be outside the vehicle when the ignition and/or engine are on.

The user can be provided with instructions during the RePA procedure. As the user is complying with the instructions, another vehicle program may cause a horn chirp warning. That is, the vehicle may be programmed to provide a warning message, such as a horn honk, when the key is outside of the vehicle, the vehicle engine is running, and the vehicle is determined to be in an enclosed area. The user may be frustrated when they are provided with a warning by one vehicle feature (key outside/engine on) when attempting to use another vehicle feature (RePA). Thus, the vehicle may inadvertently discourage or confuse the user by presenting a warning sound when the user is actively being directed to exit the vehicle with the key in hand when using RePA.

In some instances, it may be advantageous to suppress or at least delay the horn chirp if RePA is active or the vehicle is not in an enclosed area. In one example, the vehicle can determine if a user has utilized an in-vehicle human-machine interface (HMI) to activate RePA and that the user desires to park the vehicle in an available parking spot.

However, a user may use RePA without ever activating the RePA feature using the in-vehicle HMI. In some instances, the user may activate the in-vehicle HMI and the RePA feature but the user may manually drive the vehicle into an enclosed space. If they then leave the vehicle in a running state a warning may be warranted.

The systems and methods disclosed herein can determine when a driver leaves a running vehicle (with their key in possession) inside an enclosed environment and provide a warning message. This warning message can be suppressed or delayed when the vehicle is not parked in an enclosed space.

Advantageously, these features are applicable whether the user has activated the RePA feature using an in-vehicle HMI or not. These features can also minimize ancillary effect(s) on other vehicle modules. In some instances, the logic for these procedures can be incorporated into an existing advanced driver assistance systems ADAS controller. The ADAS controller can transmit signals to a body control module (BCM) that controls horn chirps. The signals can be used by the BCM to suppress or delay a horn chirp.

In sum, the systems and methods can be configured to warn a user when they have left an engine running/ignition on when they exit a vehicle enabled with keyless functionalities, but suppress the warning if they leave the vehicle to perform a remote vehicle operation, such as remote parking.

The vehicle may monitor for nearby parking spaces while the vehicle is driving. When the vehicle is below a threshold speed, and it is not clear if the user wants to park, the system may determine an available parking space. Based on the presence of the available parking space and the absence of sensor readings indicating an enclosed space, the system may assess that the vehicle is not in an enclosed space.

If the user then exits the vehicle with the engine running, the vehicle may suppress the warning because these determinations indicate the user may be performing a remote parking function. As alternatives, the system could also delay the warning, or present a warning other than a horn chip, such as flashing lights. As another example, if the system detects that the vehicle has entered a parking garage and is in an enclosed space, then the warning may be suppressed (because it is likely that the vehicle is parked in this situation).

Illustrative Embodiments

Figure 2:
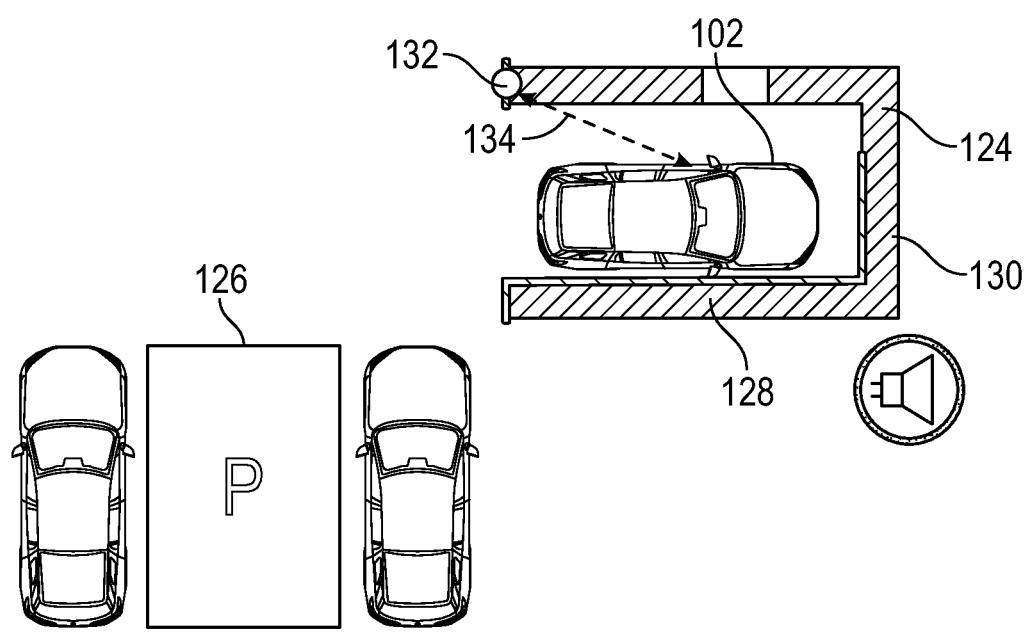
FIG. 2 is a schematic diagram of an example scenario where aspects of the present disclosure may be practiced.

Turning now to the drawings, FIG. 1 depicts an illustrative architecture 100 in which techniques and structures of the present disclosure may be implemented. The architecture 100 can comprise a vehicle 102 in an operating area 104 that includes a parking space 106. The operating area 104 can include an open area or an enclosed area around the parking space 106. In general, an enclosed area would include, for example, a garage or carport. An open area would include, for example, a location in an open parking lot or street parking. FIG. 1 illustrates an example use case where the parking space 106 is located in an open area. FIG. 2 illustrates an example use case where the parking space 106 is located in an enclosed area.

The vehicle 102 generally comprises an ADAS controller 108, a vehicle sensor system 110, an engine control module 112, and a body control module (BCM) 114. The ADAS controller 108 can comprise a processor 116 and memory 118 for storing executable instructions, the processor 116 can execute instructions stored in memory 118 for performing any of the parking and warning management features disclosed herein, such as a RePA or another similar parking feature. Also, the ADAS controller 108 can direct signals or messages to each of the engine control module 112 and/or the body control module (BCM) 114. In some instances, these signals or messages can be based on an analysis of the output of the vehicle sensor system 110. When referring to operations performed by the ADAS controller 108, it will be understood that this includes the execution of instructions stored in memory 118 by the processor 116. It will also be understood that each of the engine control module 112 and the BCM 114 may include a dedicated processor and memory.

In some instances, the vehicle sensor system 110 can include any one or more of ultrasonic sensors, radar sensors, cameras, lidar sensors, temperature sensors, light intensity sensors, and/or the like. The vehicle sensor system 110 can be configured to detect features of an enclosure, such as fencing, walls, barriers, ceilings, and the like. The vehicle sensor system 110 can detect these features using, for example, distance readings. In other instances, the vehicle sensor system 110 can utilize more sophisticated image processing methods to identify features of an enclosure using, for example, image recognition. The vehicle may also make use of navigation, infrastructure or geo-fencing data. For example, based on location the ADAS controller 108 may be configured to enable a vehicle setting that allows the driver to actively disable the horn chirp for a specific location. As an example, the vehicle may be parked at a location for which the driver knows they always want to park the vehicle, but for which other conditions do not trigger the suppression. The driver could then actively add a specific location to a "white list" thus preventing, for example, irritation to those in the neighborhood. In some instances, the vehicle sensor system 110 can be configured to infer that the vehicle is in an enclosed area. For example, the vehicle sensor system 110 detect the absence of GPS data and/or weak radio reception as indicators of being in an enclosed space. This information combined with location information for a map identifying the vehicle as being in a parking garage or urban area may be used to verify this inference.

In operation, a user can activate the RePA feature through a human-machine interface (HMI 120) of the vehicle 102. To be sure, the methods herein may not require the RePA feature to be activated by the user through the HMI 120.

The ADAS controller 108 can utilize the output of the vehicle sensor system 110 to identify the parking space 106 when a speed of the vehicle is below a threshold speed (such as five miles per hour). That is, when the vehicle 102 is operating at or below the threshold speed, the ADAS controller 108 can utilize the output of the vehicle sensor system 110 to scan for available parking spaces. These available parking spaces can be tracked and evaluated regardless of whether the RePA feature has been activated or not.

In some instances, the ADAS controller 108 can determine a location of the parking space 106 and estimate a location of the vehicle 102 relative to the location of the parking space 106. Again, this is possible because the location of the parking space 106 is tracked and stored and the speed of the vehicle is known to the ADAS controller 108.

The ADAS controller 108 can determine the parking space 106 to be in an open space, such as a parking lot or street. For example, the ADAS controller 108 can utilize the vehicle sensor system 110 to scan for features of an enclosure. When no features that are indicative of an enclosure are detected, the ADAS controller 108 can transmit a signal to the BCM 114 to suppress or delay the presentation of a warning message to the user when the user exits the vehicle 102 and a key 122 is removed from the vehicle 102. In sum, the BCM 114 can suppress or delay a warning message that indicates that the key 122 of the vehicle 102 is no longer present inside the vehicle and the vehicle is in the open area. As noted above, the key 122 can include a keyfob or other similar driver authentication device(s) such as a smartphone enabled with an application or phone-as-a-key "PaaK", near-field communications "NFC" card, radio-frequency "RF" identification card, and the like.

In this example, the user has stopped the vehicle 102. While it may not be clear that the user desires to park, the ADAS controller 108 (which implements the RePA feature) may detect the parking space 106 within the immediate vicinity of the vehicle 102. Again, the user may or may not have activated the in-vehicle HMI 120. The user may leave the vehicle, taking the key 122 with them, while the engine of the vehicle remains on. It will be understood that the ADAS controller 108 can determine the engine status (e.g., engine on/off, ignition on/off) from the engine control module 112. The ADAS controller 108 can communicate with the vehicle sub-system that tracks and determines key presence to determine when the key 122 is present within the vehicle 102 and/or is located outside the vehicle 102 but still within communications distance. To be sure, the key 122 can communicate with the vehicle 102 over a short-range wireless connection such as BLUETOOTH, near-field communications, and the like.

The ADAS controller 108 can also analyze movement of the key 122. A user attempting to use RePA may exit the vehicle, but remain in the vicinity. An example legal RePA specification is for the user to remain within a predetermined distance from the vehicle, such as six meters during a RePA maneuver. If the ADAS controller 108 detects that the key 122 is continuously moving away from the vehicle, the ADAS controller 108 can cause a horn chirp if movement is detected ongoing beyond this range (e.g., movement beyond a threshold distance away from the vehicle). As per the delay, the ADAS controller 108 can wait a certain time (for example, three minutes) and may infer that if no RePA maneuver has been started within that time and the key is not detected in the vicinity, the horn chirp is activated and a message can be pushed to the user's mobile device.

The ADAS controller 108 can implement a RePA procedure to remotely park the vehicle 102 when the key 122 is outside the vehicle 102 and the user has selected to use the RePA feature. Moreover, the user has exited the vehicle 102 and the vehicle 102 is in an engine on/ignition on the configuration.

Based on the detection of the parking space 106 and the absence of sensor readings indicating an enclosed space, the ADAS controller 108 can determine that the vehicle is not in an enclosed space and transmits a signal to the BCM 114 to suppress a horn chirp or other warning message. That is, the BCM 114 can control the operations of a horn 115. Instead of completely suppressing the horn chirp, the message transmitted to the BCM 114 from the ADAS controller 108 may cause the BCM 114 to delay the warning. In some instances, instead of playing a horn chirp, the BCM 114 may activate a secondary warning such as activating the hazard lights of the vehicle 102.

Referring now to FIGS. 1 and 2 collectively, which illustrates another scenario where a user is parking their vehicle 102 in a garage 124, which is an example of an enclosed area. Also, a parking space 126 may be present in front of the garage 124 as indicated. The ADAS controller 108 of vehicle 102 may determine the presence of the parking space 126 as a potential trigger to suppress a horn chirp or other warning message. However, the user parks the vehicle in the garage 124. The ADAS controller 108 utilizes the output of the vehicle sensor system 110 to detect features of an enclosure such as a side wall 128 of the enclosure and also a front wall 130. Wall detection may be based on distance measurements, but can also be based on image detection logic implemented by the ADAS controller 108 from front, side, and/or rear cameras mounted on the vehicle 102. As an additional measure, ADAS controller 108 can be configured to also utilize an RePA beacon sensing and/or map data for garage detection (entry point detection). For example, the ADAS controller 108 can receive signals from a RePA beacon 132 associated with the garage 124. These signals can be received over a short-range or long-range wireless communications link 134. Based on the collective information obtained, the ADAS controller 108 can determine that the vehicle 102 is likely in an enclosed space or environment. Thus, the ADAS controller 108 may not transmit a signal to the BCM 114 to suppress or delay a horn chirp. The driver is therefore warned when they leave the vehicle without having stopped the engine.

Figure 3:
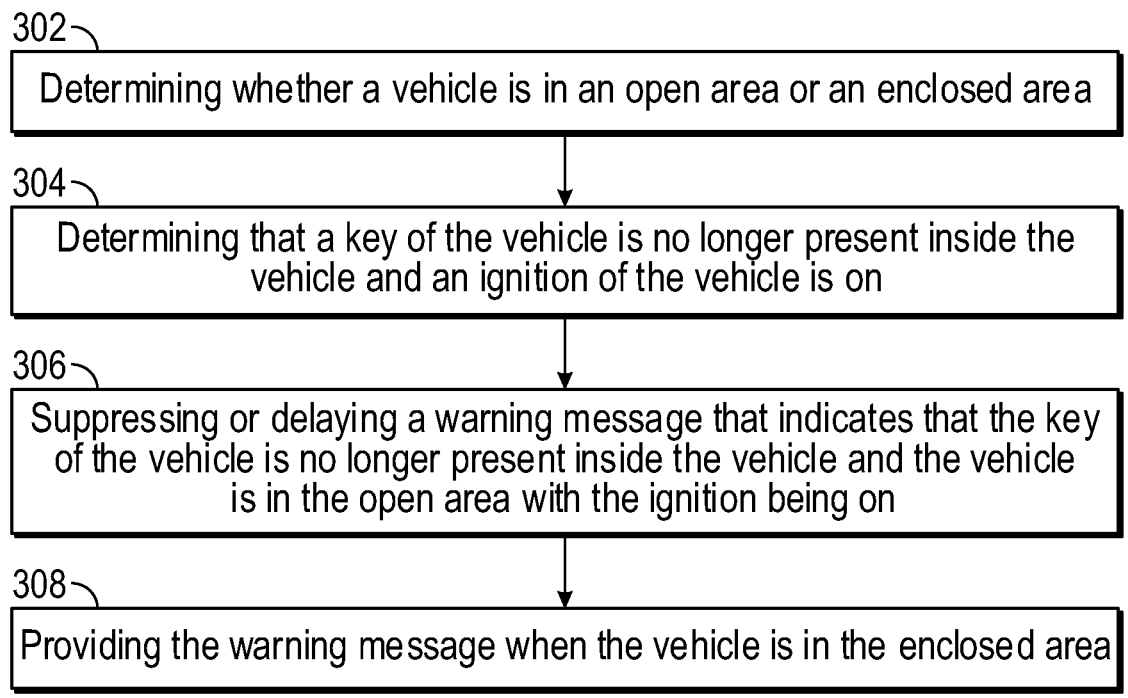
FIG. 3 is a flowchart of an example method of the present disclosure.

FIG. 3 is a flowchart of an example method. The method can include a step 302 of determining whether a vehicle is in an open area or an enclosed area. As noted above, this can include using output from a vehicle sensor system. Next, the method can include a step 304 of determining that a key of the vehicle is no longer present inside the vehicle and an ignition of the vehicle is on. For example, the user has exited the vehicle with their key, and the vehicle is still running. This situation is common during events such as remote parking.

The method can include a step 306 of suppressing or delaying a warning message that indicates that the key of the vehicle is no longer present inside the vehicle and the vehicle is in the open area with the ignition being on. Thus, in combination, the key is outside the vehicle, the ignition is on, and the vehicle is in an open area. Otherwise, the method can include a step 308 of providing the warning message when the vehicle is in the enclosed area. Thus, when the key is outside the vehicle and the ignition is on, but the vehicle is in an enclosed area, a warning message such as a horn chirp may be used to alert the user.

In some instances, the method can include determining activation of a parking feature by a user such as RePA. The method can also include determining user interaction with a human-machine interface that activates the parking feature. In some instances, the parking feature allows a user to park the vehicle while standing outside the vehicle with the key outside the vehicle.

The method can involve determining a parking space for the vehicle. This can include detecting an available parking space using a camera of a vehicle sensor platform. The method can also include estimating a location of the vehicle based on the parking space. For example, a location of the parking space may be known. The location of the vehicle may be a relative location of the vehicle to the parking space (e.g., how far the vehicle is from the parking space). In some instances, the method can include detecting features that are indicative of the parking space being in the enclosed area or the open area based on output of a vehicle sensor system. Thus, the vehicle is configured to periodically or continually locate features of an enclosure.

Figure 4:
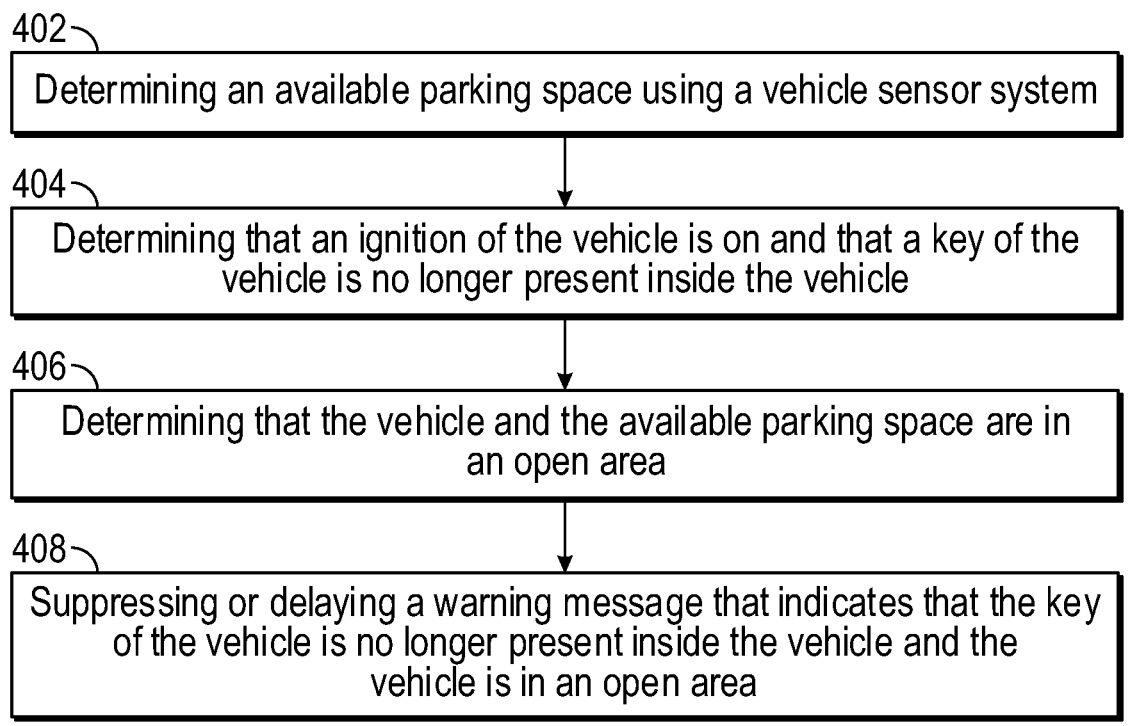
FIG. 4 is a flowchart of another example method of the present disclosure.

FIG. 4 is a flowchart of an example method. The method can include a step 402 of determining an available parking space using a vehicle sensor system. As noted above, an ADAS controller can scan for available parking spaces when the vehicle is driving slower than a threshold speed.

Next, the method includes a step 404 of determining that an ignition of the vehicle is on and that a key of the vehicle is no longer present inside the vehicle. The ADAS controller can communicate with an engine control module to determine engine status. The ADAS controller can also determine when the key is no longer present in the vehicle but is still within communication distance with the vehicle.

The method can also include a step 406 of determining that the vehicle and the available parking space are in an open area, as well as a step 408 of suppressing or delaying a warning message that indicates that the key of the vehicle is no longer present inside the vehicle and the vehicle is in an open area, as well as the engine or ignition of the vehicle being on. Additionally, the ADAS controller can infer or determine that the vehicle is in an open space when there is a lack of indication from a vehicle sensor system that a feature of an enclosure has been found.

In some instances, the method can include directing the vehicle into the available parking space. For example, the ADAS controller can autonomously drive the vehicle into the parking space. The method can also include a step of determining that the vehicle is in an enclosed space rather than the open space as the vehicle is being driven into the available parking space based on the output of the vehicle sensor system. A warning message can be provided based on the vehicle being in the enclosed area.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method for vehicle parking assistance comprising:
   determining, by a controller, whether a vehicle is in an open area or an enclosed area;
   determining, by the controller, that a key of the vehicle is no longer present inside the vehicle and an ignition of the vehicle is on;
   suppressing or delaying, by the controller and based on determining that the vehicle is in the open area with the ignition on, a warning message that indicates that the key of the vehicle is no longer present inside the vehicle; and
   providing, by the controller and based on determining that the vehicle is in the enclosed area, the warning message.

2. The method according to claim 1, further comprising determining, by the controller, activation of a parking feature by a user.

3. The method according to claim 2, wherein determining activation of the parking feature comprises determining, by the controller, user interaction with a human-machine interface that activates the parking feature.

4. The method according to claim 2, wherein the parking feature allows the user to park the vehicle while standing outside the vehicle.

5. The method according to claim 1, wherein the warning message includes honking a horn of the vehicle.

6. The method according to claim 1, further comprising:
   determining, by the controller, a parking space for the vehicle; and
   estimating, by the controller, a location of the vehicle based on the parking space.

7. The method according to claim 6, further comprising detecting features that are indicative of the parking space being in the enclosed area or the open area based on output of a vehicle sensor system.

8. The method according to claim 1, further comprising detecting entry points of the enclosed space as the vehicle enters the enclosed area.

9. A system for vehicle parking assistance comprising:
   a vehicle sensor system; and
   a controller comprising a processor and memory, the memory storing instructions that are executed by the processor to:
      determine that a key of a vehicle is no longer present inside the vehicle and an ignition of the vehicle is running;
      determine whether the vehicle is in an open area or an enclosed area using output of the vehicle sensor system;
      suppress or delaying, based on determining that the vehicle is in the open area with the ignition on, a warning message that indicates that the key of the vehicle is no longer present inside the vehicle; and
      provide the warning message without delay or suppression when the vehicle is determined to be in the enclosed area.

10. The system according to claim 9, wherein the processor is configured to determine when the vehicle is being driven below a threshold speed and detect when an available parking space is encountered.

11. The system according to claim 10, wherein the processor is configured to estimate a location of the vehicle based on a location of the available parking space.

12. The system according to claim 10, wherein the processor is configured to detect features that are indicative of the available parking space being in the enclosed area or the available parking space based on the output of the vehicle sensor system.

13. The system according to claim 9, wherein the processor is configured to determine that the vehicle is in the enclosed area based on detection of an entry point of the enclosed area, the enclosed area being a garage or carport.

14. The system according to claim 9, further comprising a human-machine interface that allows a user to select activation of a parking feature for the vehicle.

15. A method for vehicle parking assistance comprising:
   determining, by a controller, an available parking space using a vehicle sensor system;
   determining, by the controller, that an ignition of a vehicle is on and that a key of the vehicle is no longer present inside the vehicle;
   determining, by the controller, that the vehicle and the available parking space are in an open area; and
   suppressing or delaying, by the controller and based on determining that the vehicle is in the open area with the ignition on, a warning message that indicates that the key of the vehicle is no longer present inside the vehicle.

16. The method according to claim 15, wherein the warning message comprises a horn chirp.

17. The method according to claim 16, further comprising providing, by the controller, a secondary warning message that comprises a light flash.

18. The method according to claim 15, further comprising directing, by the controller, the vehicle into the available parking space.

19. The method according to claim 15, further comprising determining, by the controller, that the vehicle is in an enclosed area rather than an open space as the vehicle is being driven into the available parking space based on output of the vehicle sensor system.

20. The method according to claim 19, further comprising providing, by the controller, the warning message based on determining that the vehicle is in the enclosed area.

* * * * *